(12) United States Patent
McWilliams, III et al.

(10) Patent No.: US 8,942,964 B2
(45) Date of Patent: Jan. 27, 2015

(54) OPTICAL STATE ESTIMATION AND SIMULATION ENVIRONMENT FOR UNMANNED AERIAL VEHICLES

(75) Inventors: George T. McWilliams, III, San Antonio, TX (US); Kevin J. Alley, San Antonio, TX (US); Christopher I. Mentzer, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 597 days.

(21) Appl. No.: 12/796,429

(22) Filed: Jun. 8, 2010

(65) Prior Publication Data

US 2011/0301925 A1 Dec. 8, 2011

(51) Int. Cl.
G06G 7/48 (2006.01)
G09B 9/08 (2006.01)
G09B 9/48 (2006.01)

(52) U.S. Cl.
CPC ... *G09B 9/48* (2013.01); *G09B 9/08* (2013.01)
USPC ................................................ 703/8; 434/38

(58) Field of Classification Search
USPC .......... 703/6, 7, 8; 434/11, 14, 27, 30, 37, 38; 701/11, 23, 24, 30.9, 32.3, 32.4, 400, 701/436
See application file for complete search history.

(56) References Cited

U.S. PATENT DOCUMENTS

| | | | |
|---|---|---|---|
| 4,624,563 A | 11/1986 | Johnson | |
| 5,134,680 A | 7/1992 | Schempp | |
| 5,429,635 A | 7/1995 | Purcell, Jr. et al. | |
| 5,892,867 A | 4/1999 | Riser et al. | |
| 6,086,234 A | 7/2000 | Riser et al. | |
| 6,292,608 B1 | 9/2001 | Toh | |
| 6,473,238 B1 | 10/2002 | Daniell | |
| 6,501,543 B2 | 12/2002 | Hedges et al. | |
| 6,678,098 B2 | 1/2004 | Amery et al. | |
| 6,847,865 B2 | 1/2005 | Carroll | |
| 6,999,110 B2 | 2/2006 | Kobayashi | |
| 7,059,778 B2 | 6/2006 | Suzuki et al. | |

(Continued)

FOREIGN PATENT DOCUMENTS

EP 1096268 5/2001

OTHER PUBLICATIONS

Dusha et al. (Altitude estimation for a fixed-wing aircraft using horizon detection and optical flow, 2007 (pp. 1-8).*

(Continued)

*Primary Examiner* — Kandasamy Thangavelu
*Assistant Examiner* — Andre Pierre Louis
(74) *Attorney, Agent, or Firm* — Grossman, Tucker et al (57) ABSTRACT

The present disclosure relates to a method and system for simulating an unmanned aerial vehicle (UAV) and simulating an environment in which the UAV may be flying. A plurality of visual sensors, e.g., cameras, positioned on the UAV, may be simulated. A UAV simulator is configured to simulate the UAV and a graphical simulator is configured to simulate the environment. The UAV simulator may be configured to: estimate pitch, roll and/or groundspeed based, at least in part, on outputs from the visual sensors, determine a position and/or an orientation of the simulated UAV in the simulated environment based, at least in part, on the estimate(s) and provide the position and/or orientation to the graphical simulator. The graphical simulator may be configured to display the simulated UAV at the position and/or orientation in the simulated environment and/or to display the simulated camera view(s).

16 Claims, 8 Drawing Sheets

(56) References Cited

U.S. PATENT DOCUMENTS

| | | |
|---|---|---|
| 7,110,092 B2 | 9/2006 | Kasper et al. |
| 7,171,088 B2 | 1/2007 | Koyama et al. |
| 7,228,232 B2 | 6/2007 | Bodin et al. |
| 7,277,053 B2 | 10/2007 | Riel et al. |
| 7,347,555 B2 | 3/2008 | Grover |
| 7,375,312 B2 | 5/2008 | Butterworth |
| 7,429,997 B2 | 9/2008 | Givon |
| 7,518,099 B2 | 4/2009 | Pallaro et al. |
| 7,546,187 B2 | 6/2009 | Bodin et al. |
| 7,593,794 B2 | 9/2009 | Chahl et al. |
| 7,619,754 B2 | 11/2009 | Riel et al. |
| 8,466,406 B2 | 6/2013 | Hvass et al. |
| 2004/0066449 A1 | 4/2004 | Givon |
| 2006/0074557 A1* | 4/2006 | Mulligan et al. ............... 701/213 |
| 2006/0268360 A1 | 11/2006 | Jones |
| 2007/0103698 A1 | 5/2007 | Liu et al. |
| 2007/0103699 A1 | 5/2007 | Kohnen et al. |
| 2008/0033604 A1 | 2/2008 | Margolin |
| 2008/0084568 A1 | 4/2008 | Rich |
| 2008/0085077 A1 | 4/2008 | Miyanari |
| 2008/0225406 A1 | 9/2008 | Wada |
| 2008/0309949 A1 | 12/2008 | Rueb |
| 2008/0316462 A1 | 12/2008 | Riel et al. |
| 2009/0244534 A1 | 10/2009 | Narayana et al. |
| 2010/0141767 A1 | 6/2010 | Mohanty et al. |
| 2011/0106339 A1* | 5/2011 | Phillips et al. .................... 701/2 |
| 2011/0181767 A1 | 7/2011 | Neutzler et al. |
| 2011/0273451 A1* | 11/2011 | Salemann ..................... 345/427 |
| 2011/0285590 A1* | 11/2011 | Wellington ................... 342/417 |
| 2011/0295569 A1* | 12/2011 | Hamke et al. ...................... 703/2 |
| 2012/0286147 A1 | 11/2012 | Hvass et al. |

OTHER PUBLICATIONS

Barjatya (Block matching algorithms for motion estimation, 2004 (pp. 1-6).*

Simulink 7, "Product brochure for The MathWorks," available at www.mathworks.com retrieved on Nov. 5, 2010.

General Dynamics, "Multiple Unified Simulation Environment/Air Force Synthetic Environment for Reconnaissance and Surveillance (MUSE/AFSERS)," available at http://www.gdc4s.com/content/detail.cfm?item=cf9ff114-9876-4e5d-b722-5fa932126f1d retrieved on Apr. 6, 2010.

Flightgear, "FlightGear Flight Simulator Product Features," available at http://www.flightgear.org/features.html, retrieved on Apr. 6, 2010.

The Mathworks, Inc., "Block Matching Estimate motion between images or video frame," available at http://www.mathworks.com/help/toolbox/vipblks/ref/blockmatching.html, retrieved on Apr. 6, 2010.

Office Action dated Jun. 6, 2012 issued in related U.S. Appl. No. 12/693,669 (11 pgs).

McWilliams, et al., "A Simulation Environment for Evaluating Image Processing Techniques for UAV Applications," 09ATC-0054; 2009 SAE International (7 pages).

Chen, et al., "Fast Block Matching Algorithms for Motion Estimation," Department of Electrical and Electronic Engineering, The University of Hong Kong. IEEE International Conference on Acoustics, Speech, and Signal Processing, 1996. ICASSP-96 vol. 4.

Persson, "Visual-servoing Based Tracking for an UAV in a 3D simulation Environment," Proceedings of SPIE vol. 4714 (2002).

Shaw, et al., "Landmark recognition for localisation and navigation of aerial vehicles" Proceedings of the 2003 IEEURSJ, InU Conference on Intelligent Robots and Systems, Las Vegas, Nevada Oct. 2003; pp. 42-47.

Rathinam, "Vision Based Following of Locally Linear Structures using an Unmanned Aerial Vehicle," Proceedings of the 44th IEEE Conference on Decision and Control, and the European Control Conference 2005, Seville, Spain, Dec. 12-15, 2005.

Wu, et al., "Vision-Aided Inertial Navigation for Flight Control," AIAA Guidance, Navigation, and Control Conference and Exhibit, Aug. 15-18, 2005, San Francisco, California. (13 pages).

Proctor, et al. "Vision-Only Aircraft Flight Control Methods and Test Results," AIAA Guidance, Navigation, and Control Conference and Exhibit, Aug. 16-19, 2004, Providence, Rhode Island. (16 pages).

Grzywna, et al., "Rapid Development of Vision-Based Control for MAVs through a Virtual Flight Testbed," Proceedings of the 2005 IEEE International Conference on Robotics and Automation, 2005. Issue Date: Apr. 18-22, 2005; pp. 3696-3702.

Chen, "Efficient Block Matching Algorithm for Motion Estimation," International Journal of Signal Processing 5;2. pp. 133-137.

Final Office Action, mailing date Dec. 3, 2012 issued in related U.S. Appl. No. 12/693,669 (14 pgs).

Notice of Allowance, mail date Apr. 19, 2013 issued in related U.S. Appl. No. 13/106,290 (9 pgs).

U.S. Office Action, mailing date Feb. 4, 2014, issued in related U.S. Appl. No. 12/693,669 (18 pgs).

US Notice of Allowance, mail date Jul. 10, 2014 issued in related U.S. Appl. No. 12/693,669 (10 pgs).

* cited by examiner

OPTICAL STATE ESTIMATION AND SIMULATION ENVIRONMENT FOR UNMANNED AERIAL VEHICLES

FIELD OF THE INVENTION

This disclosure relates to estimating pitch, roll and/or groundspeed based on optical images, in a simulation environment, for unmanned aerial vehicles.

BACKGROUND

Unmanned aerial vehicles (UAVs) may use "traditional" air vehicle sensors for flight control. These sensors include global positioning system (GPS) sensors, inertial sensors, magnetometers, pressure sensors and/or air flow sensors. These UAVs may typically be used in military roles for intelligence, surveillance and reconnaissance (ISR) applications by transmitting information to a ground control station (GCS). Future UAVs may be configured to provide additional capabilities, e.g., flying in urban canyons, avoiding obstacles, detecting and recognizing potential targets, flying in a leader follower formation, automated visual searches, localization using geo-registration, and/or flying inside buildings or other structures. Sensors configured to support these additional capabilities may add size and cost to the UAV which is undesirable.

SUMMARY

The present disclosure relates in one embodiment to a method for simulating an unmanned aerial vehicle (UAV) in a simulated environment. The method includes receiving an output from at least one simulated visual sensor positioned on the simulated UAV; estimating at least one parameter associated with the simulated UAV, based at least in part, on the output from the simulated visual sensor, using a first processor; determining at least one of a position and an orientation of the simulated UAV, based at least in part, on the estimate of the at least one parameter, using the first processor; and simulating the UAV in the simulated environment at the at least one of the position and the orientation, using a second processor.

The present disclosure relates in another embodiment to a system. The system includes a first processor configured to simulate an unmanned aerial vehicle (UAV); estimate at least one parameter associated with the UAV, based at least in part, on an output from at least one simulated visual sensor; and determine at least one of a position and an orientation of the UAV, based at least in part, on the estimate of the at least one parameter. The system further includes a second processor configured to simulate an environment, and simulate the UAV in the environment at the at least one of the position and the orientation.

In yet another embodiment, the present disclosure relates to an article comprising a storage medium having stored thereon instructions that when executed by a machine result in the following operations for simulating an unmanned aerial vehicle (UAV) in a simulated environment: receiving an output from at least one simulated visual sensor positioned on the simulated UAV; estimating at least one parameter associated with the simulated UAV, based at least in part, on the output from the simulated visual sensor, using a first processor; determining at least one of a position and an orientation of the simulated UAV, based at least in part, on the estimate of the at least one parameter, using the first processor; and simulating the UAV in the simulated environment at the at least one of the position and the orientation, using a second processor.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

In general, the present disclosure describes a method and system for simulating an unmanned aerial vehicle (UAV) and simulating an environment in which the UAV may be flying. A UAV simulator is configured to simulate the UAV and a graphical simulator is configured to simulate the environment. The graphical simulator may further simulate a plurality of visual sensors, e.g., cameras, configured to provide camera views of the simulated environment. The simulated cameras are configured to provide views corresponding to positions and orientations relative to the UAV. The UAV simulator may include an image processing portion, e.g., an image processor, configured to receive the simulated camera views and to determine and/or estimate a parameter, e.g., pitch, roll and/or groundspeed, associated with the UAV, based at least in part, on the camera views. The UAV simulator may be configured to output to the graphical simulator a position and/or orientation of the UAV in the simulated environment. The graphical simulator is configured to provide the simulated camera views based, at least in part, on the position and/or orientation of the UAV provided by the UAV simulator. The graphical environment is configured to display the environment, the camera views and the simulated UAV in the environment.

Figure 1:
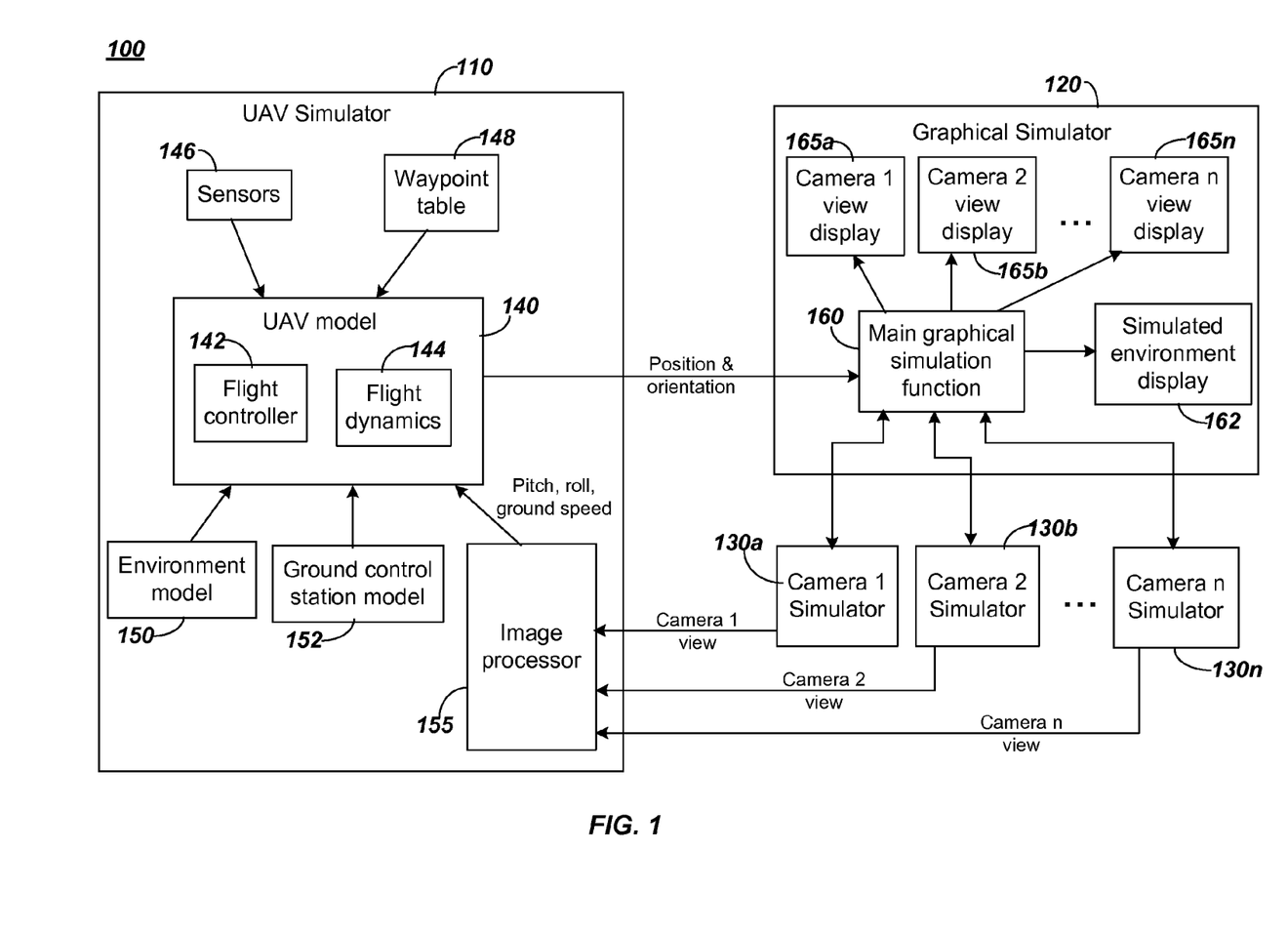
FIG. 1 depicts an exemplary system block diagram consistent with the present disclosure.
Figure 2A:
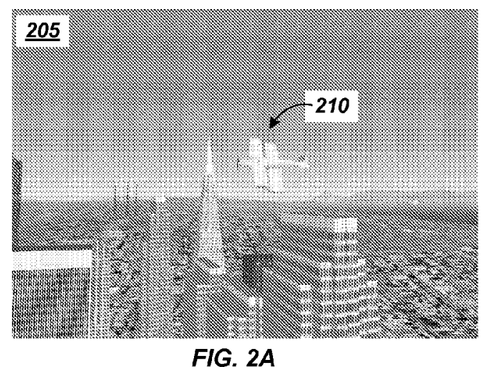
FIG. 2A depicts an exemplary display of a simulated environment, including a simulated unmanned aerial vehicle ("UAV").

Attention is directed to FIG. 1 which depicts an exemplary system 100 block diagram of a simulation environment consistent with the present disclosure. The system 100 may include a UAV simulator 110 and a graphical simulator 120. The UAV simulator 110 is configured to simulate a UAV and to provide UAV position and/or orientation data to the graphical simulator 120. UAV position may be understood as a three-dimensional location in the simulated environment, which may be specified by x, y and z coordinates. Orientation may be understood as pitch, roll and/or yaw of the simulated UAV in the simulated environment. The graphical simulator 120 is configured to simulate and/or display a simulated environment. The graphical simulator 120 is configured to display a simulated UAV in the simulated environment, based at least in part, on the position and/or orientation data. FIG. 2A depicts an exemplary display 205 of a simulated environment, including a simulated UAV 210.

The system 100 may include a plurality of simulated visual sensors, e.g., camera simulators 130a, . . . , 130n. The camera simulators 130a, . . . , 130n are configured to provide simulated camera views to the graphical simulator 120 for display and to the UAV simulator 110 for processing, as described herein. The camera simulators 130a, . . . , 130n are configured to provide camera views based, at least in part, on the position and/or orientation data from the UAV simulator 110. In an embodiment, the camera simulators 130a, . . . , 130n may be included in the graphical simulator 120. In another embodiment, the camera simulators 130a, . . . , 130n may be coupled to the graphical simulator 120. For example, each camera simulator may be implemented in a corresponding computer system.

The UAV simulator 110 may include a UAV model 140 that includes a flight controller 142 and flight dynamics 144. The flight controller 142 is configured to control the flight of the simulated UAV, e.g., to provide control inputs to the flight dynamics 144, and the flight dynamics 144 are configured to model (simulate) the UAV in flight, as will be understood by one skilled in the art. The UAV simulator 110 may include one or more sensors 146 configured to simulate sensors on-board a UAV. For example, the sensor(s) 146 may include global positioning system (GPS) sensor(s), inertial sensor(s), magnetometer(s), pressure sensor(s) and/or air flow sensor(s). The UAV simulator 110 may include a waypoint table 148 configured to provide waypoint data to the UAV model 140. The UAV simulator 110 may include an environment model 150, configured to provide environmental data to the UAV model 140. Environmental data may include, but is not limited to, terrain data, e.g., map data such as digital terrain elevation data; wind data, e.g., speed, shear, turbulence and/or gust data; atmospheric data, e.g., temperature, pressure, density, humidity, precipitation; and/or gravitational data, e.g., acceleration of gravity based on latitude and/or longitude. The UAV simulator 110 may include a ground control station model 152, configured to simulate commands from and/or communication to a ground control station.

The UAV simulator 110 may include an image processor 155. The image processor is configured to receive camera view(s) from the camera simulator(s) 130a, . . . , 130n and to provide estimates of pitch, roll and groundspeed to the UAV model 140, based at least in part, on the camera views, as described herein. The UAV simulator 110 is configured to determine a velocity of the simulated UAV. For example, the UAV simulator 110 may determine the velocity based, at least in part, on at least one of the estimates of pitch, roll and groundspeed. Velocity is a vector having a magnitude and a direction and may be understood as a change in position, i.e., three-dimensional location, with respect to time (i.e., a time derivative of position). For example, groundspeed may correspond to a magnitude of a velocity of the simulated UAV relative to ground, e.g. a surface over which the UAV is flying.

The graphical simulator 120 may include a main graphical simulation function 160 configured to receive the camera view(s) from the camera simulator(s) 130a, . . . , 130n. The main graphical simulation function 160 may be configured to receive position and/or orientation data from the UAV simulator and to provide the position and/or orientation data to the camera simulator(s) 130a, . . . , 130n. The graphical simulator 120 may include a simulated environment display 162 configured to display the simulated environment, including the simulated UAV. The graphical simulator 120 may include one or more camera view displays 165a, . . . , 165n, each configured to display a respective camera view from camera simulators 130a, 130b, . . . , 130n, respectively.

Figure 2B:
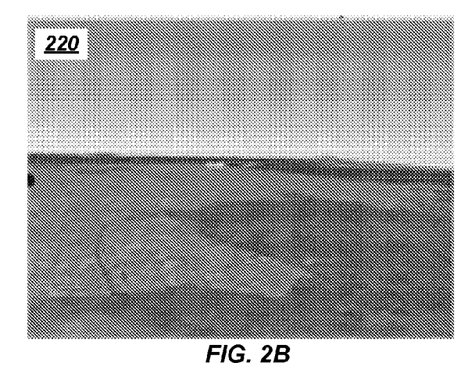
FIGS. 2B through 2D depict exemplary camera views of three simulated cameras, positioned on a UAV.
Figure 2C:
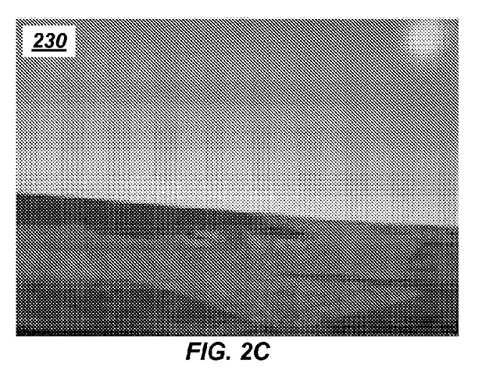
Figure 2D:
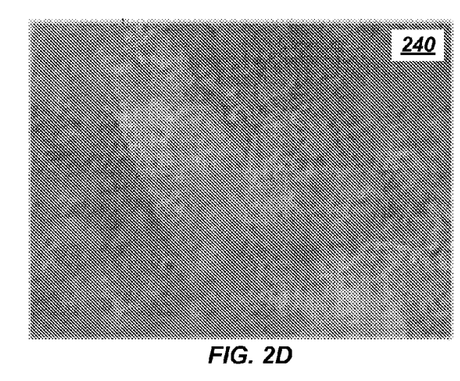
Figure 2E:
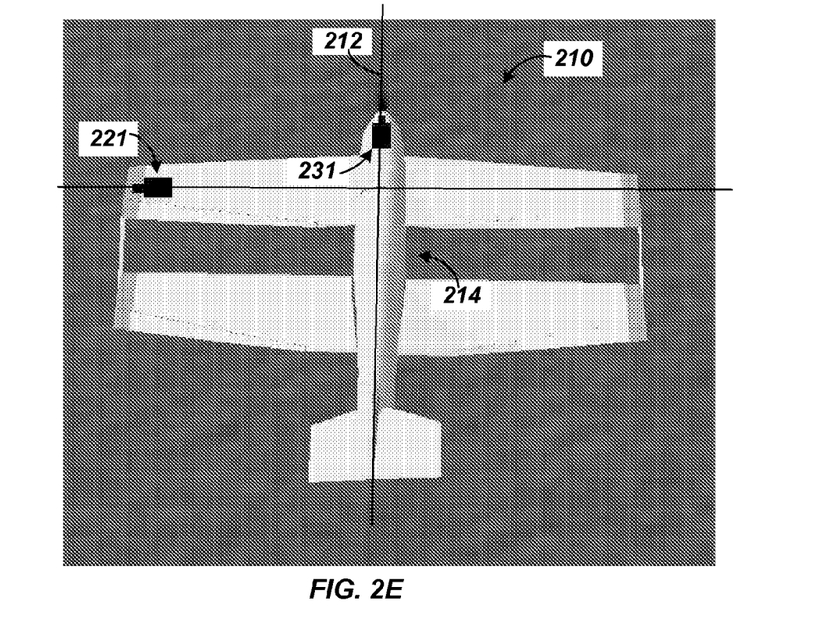
FIGS. 2E and 2F illustrate positions of the three simulated cameras on the UAV.
Figure 2F:
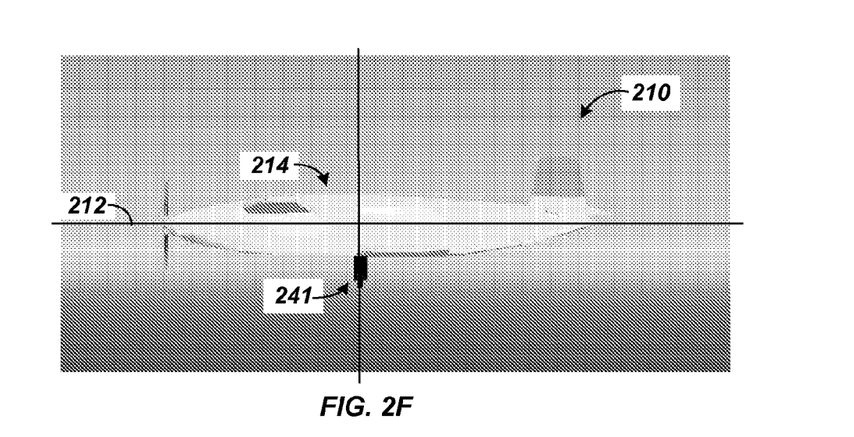

FIGS. 2B through 2D depict exemplary camera views 220, 230, 240, respectively, of three simulated cameras 221, 231, 241. FIGS. 2E and 2F illustrate positions of the simulated cameras 221, 231, 241 on the UAV 210, corresponding to camera views 220, 230, 240, respectively. It should be appreciated that one or more camera(s) may be positioned anywhere on the UAV 210 and may be oriented in any direction relative to the UAV 210. The positions and orientations illustrated in FIGS. 2E and 2F are illustrative. Camera view 220 corresponds to a first simulated camera 221 positioned on or near a wing tip of the UAV 210 and pointed in a direction generally perpendicular to a long axis 212 of a fuselage 214 of the UAV 210. Camera view 230 corresponds to a second simulated camera 231 positioned on or near a nose of the UAV 210 and pointed in a forward direction relative to the UAV 210, generally parallel to the long axis 212 of the fuselage 214 of the UAV 210. Camera view 240 corresponds to a third simulated camera 241 positioned generally centrally on a bottom surface of the fuselage 214 of the UAV 210 and pointed generally perpendicular to the bottom surface of the fuselage 214 of the UAV 210. During level flight, the simulated camera 241 may be generally pointed toward the ground.

The UAV simulator 110, the graphical simulator 120 and the camera simulator(s) 1302, . . . , 130n may be implemented using a plurality of processors and/or one or more computer system(s). For example, the UAV simulator 110 may be configured to execute on a first processor. The first processor may be included in a first computer system such as a personal computer, laptop, embedded system (e.g., including, singly or in any combination, hardwired circuitry, programmable circuitry, state machine circuitry, firmware that stores instructions executed by programmable circuitry and/or "hardware-in-the-loop systems"), or the like. The graphical simulator 120 (e.g., the main graphical simulation function 160) may be configured to execute on a second processor. Similar to the first processor, the second processor may be included in a second computer system such as a personal computer, laptop, embedded system (e.g., including, singly or in any combination, hardwired circuitry, programmable circuitry, state machine circuitry, firmware that stores instructions executed by programmable circuitry and/or "hardware-in-the-loop systems"), or the like. The second computer system is configured to display the simulated environment. The camera simulator(s) 130a, . . . , 130n may be configured to execute on the second processor in the second computer system and/or may be configured to execute on at least one other processor. The at least one other processor may be included in the second computer system or another computer system. The second computer system and/or the another computer system are configured to display the one or more camera view(s). This configuration may provide modularity and flexibility for the UAV simulator 110, graphical simulator 120 and/or camera simulator(s) 130a, . . . , 130n. A variety of UAVs may be modeled in the UAV simulator without limiting the UAV to models that may be available with the graphical simulator 120.

For example, for the displays/views illustrated in FIGS. 2A through 2D, the UAV simulator 110 was executed on a first general purpose personal computer using MATLAB®/Simulink® available from The Mathworks™, Inc., Natick, Mass., the graphical simulator 120, including camera simulators 130a, . . . , 130n, were executed on a second general purpose personal computer using a commercial off-the-shelf graphical simulator, e.g., FlightGear open source simulator, and the camera simulators 130a, . . . 130n (three camera simulators) were executed on three general purpose personal computers using FlightGear. In this example, the camera views were output from the personal computers in VGA format and framegrabbers were used to capture the VGA images and convert them to USB (Universal Serial Bus) format images that were then provided to the UAV simulator 110. Framegrabbers are configured to capture individual frames from an analog video signal or digital video stream and may then convert the captured frames to another format for output.

The system 100 is configured to provide a simulation platform for development, implementation and/or evaluation of image processing algorithms using images captured by camera(s) on-board UAVs. The modularity of the system 100 is configured to provide flexibility in modeling UAV(s), simulating an environment, simulating camera views and/or developing image processing algorithm(s). For example, the system 100 may be used for development, implementation and/or evaluation of image processing algorithms configured to estimate pitch, roll and/or groundspeed of a UAV, based at least in part, on camera views of simulated cameras positioned generally as depicted in FIGS. 2E and 2F.

Figure 3A:
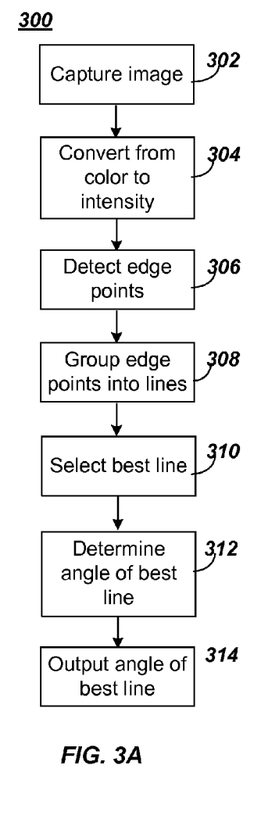
FIGS. 3A through 3D depict exemplary flow charts for estimating pitch, roll and groundspeed and operation of a simulation environment, consistent with the present disclosure.
Figure 3B:
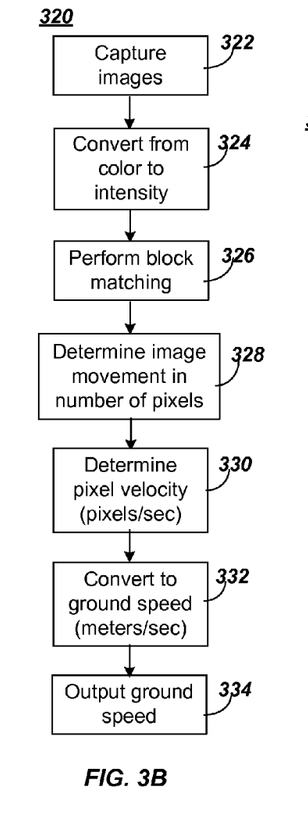

FIGS. 3A and 3B depict flow charts 300, 320 for estimating and/or determining pitch, roll, and/or groundspeed based, at least in part, on camera views, using system 100. It should be noted that the flow chart 300 is configured to estimate pitch or roll, depending on a particular camera view, as described herein. Pitch and/or roll of the UAV may be estimated based on an angle of a horizon relative to a boundary of the camera view, i.e., a horizon in a field of view of a simulated camera, relative to a boundary of the field of view.

Referring to FIG. 3A, flow may begin with capture image 302. The image may be captured from a camera simulator, e.g., camera simulator 221 for pitch or camera simulator 231 for roll. The image may be provided from the camera simulator 221, 231 and/or graphical simulator 120 to the UAV simulator 110 and may be captured by the image processor 155 of the UAV simulator 110. The captured image may then be converted from color space to intensity space at operation 304. Edge points may then be detected in the converted image at operation 306. An edge may include a plurality of edge points. An edge may be characterized by, e.g., relatively significant local changes in image intensity. An edge may occur, for example, along a horizon in an image from simulated camera 221 or simulated camera 231.

For example, a Sobel edge detector may be used to detect the edge points. The Sobel edge detector is configured to detect an edge in an image by determining a gradient of the intensity at each point in the image and selecting as edge point(s), point(s) with corresponding gradients above a threshold. The gradient corresponds to a rate of change of the intensity the image around the point relative to the intensity of the image at the point. For example, a gradient near zero, corresponds to a point in a region of similar intensity (i.e., not an edge) and a gradient above a threshold corresponds to a point that may lie on an edge. A threshold may be set for the captured image. Points with corresponding intensity gradients above the threshold may then be considered edge points. Although a Sobel edge detector has been described, other edge detection techniques may be implemented, within the scope of the present disclosure.

The edge points detected at operation 306 may then be grouped into lines at operation 308. The edge detection at operation 306 may be considered "pre-processing" for operation 308. For example, a Hough transform may be used to group edge points into a set of straight lines. Generally, the Hough transform is a technique for determining likely straight lines (or other geometric shapes) based on a set of points. In other words, given a set of points, the Hough transform may be used to determine a set of "most likely" straight lines. Each likely straight line includes a plurality of points in the set of points. "Most likely" in the Hough transform generally corresponds to a line or lines that include a relatively higher number of points compared to other detected line(s).

A best line may be selected at operation 310 based on the lines determined at operation 308. For example, the Hough transform includes a technique for detecting a line that includes a maximum number of data points compared to other lines in the set of lines. This line may be considered the "best line". The best line may correspond to the horizon in the image corresponding to the field of view of simulated camera 221 or simulated camera 231.

An angle of the best line may be determined at operation 312. The angle may be determined relative to a boundary of field of view of simulated camera 221 or simulated camera 231. The boundary of the field of view corresponds to a boundary of the captured image of simulated camera 221 or simulated camera 231. It may be appreciated that as a pitch angle or roll angle of a UAV changes relative to, e.g., the horizon, the boundaries of the field of view of simulated camera 221 or simulated camera 231 change correspondingly relative to the horizon. In other words, the position of each simulated camera may be fixed relative to the UAV so that when an angle, e.g., pitch or roll, of the UAV relative to the horizon changes, the angle of the simulated camera 221, 231 changes correspondingly. The angle of the best line may be output at operation 314. For example, the angle of the best line may be output from image processor 155 to UAV model 140.

Pitch and/or roll of a UAV may be determined according to flow chart 300, based on a simulated camera view. The UAV model is configured to receive the pitch and/or roll angle from the image processor and may control "flight" of the UAV based, at least in part, on the pitch and/or roll angle. For the simulation environment described herein, the pitch and roll angles from the image processor may be considered estimates and may be compared to other measures of pitch and/or roll provided by the UAV model. In this manner, image processing techniques may be evaluated using the simulated UAV in the simulated environment.

Turning now to FIG. 3B, there is depicted flow chart 320, configured to determine and/or estimate groundspeed based, at least in part, on a simulated camera view, e.g., simulated camera 241. Similar to flow chart 300, flow may begin with capturing images 322 and the captured images may be converted from color to intensity 324. These operations 322, 324 are similar to operations 302 and 304, described herein with respect to flow chart 300. These operations 322, 324 may be performed, for example, by image processor 155.

At operation 326, block matching may be performed on the intensity image determined at operation 324. Block matching is configured to provide an estimate of motion between a plurality of images and/or between a plurality of video frames. For example, block matching may compare a previous frame to a current frame. Block matching estimates motion between two images and/or video frames using "blocks" of pixels. A pixel is a two-dimensional picture element. A block may include $n_b$ by $m_b$ pixels where $n_b$ corresponds to a width of the block in pixels and $m_b$ corresponds to a height of the block in pixels. The block size may be selected, e.g., based on desired resolution and/or computation time. Similarly, an image and/or frame may include $n_i$ by $m_i$ pixels where $n_i$ corresponds to a width of the image and/or frame in pixels and $m_i$ corresponds to a height of the image and/or frame in pixels. For example, an image may include 640 by 480 pixels, corresponding to image size. Each frame may be divided into a number of blocks. The number of blocks may then be based on the size of the image and/or frame in pixels and the block size in pixels. The blocks corresponding to a frame may be overlapping or non-overlapping. For example, for a block size of 25 by 25 pixels, non-overlapping blocks and frame size of 640 by 480 pixels, yields about 500 blocks per image (i.e., about 25 blocks wide by about 20 blocks high).

In order to estimate motion between a previous frame and a current frame, block matching may be performed for each block in the previous frame ("previous block"). For each previous block, a neighborhood of the current frame may be searched for a block of pixels that best matches the previous block. A difference in position of the previous block and the best match block corresponding to the previous block may be used to determine a velocity of the UAV, as described herein. The neighborhood corresponds to a search region in the current frame. The search region is generally larger than the block size and may be centered at a location in the current frame corresponding to a center of the previous block in the previous frame. A relatively larger search region corresponds to a relatively longer computation time. It may be desirable to minimize the size of the search region while providing a search region large enough to capture the maximum anticipated groundspeed. The size of the search region may be based on the maximum anticipated groundspeed, altitude and a field of view of the simulated camera. For example, the search region may be 25 plus 14 pixels wide by 25 plus 14 pixels high. In other words, the search region may include the previous block plus a band of 7 pixels in width surrounding the previous block. For example, the width of the band may be selected based on a maximum anticipated groundspeed at a current altitude and may be based, at least in part, on the simulated camera field of view.

The best match block corresponding to the previous block may be determined based on a difference in intensity of each pixel in the previous block and a corresponding pixel in the block of pixels in the current frame. For example, the difference in intensity may be calculated using a mean absolute difference ("MAD") over the block. In another example, the difference may be calculated using a mean square error ("MSE") over the block. It may be appreciated that the MSE may weight outliers relatively greater than the MAD. The block of pixels with a minimum corresponding error, i.e., mean absolute difference or mean square error, for the search region is the best match block for the search region. Accordingly, a best match block in the current image and/or frame may be determined for each previous block in the previous image and/or frame.

A two-dimensional change in position may then be determined for each previous block relative to the best match block of the current image corresponding to the previous block. Image movement in number of pixels may then be determined at operation 328. A two-dimensional change in position for the current image and/or frame relative to the previous image and/or frame may then be determined. For example, the two-dimensional changes in position for each current block in the current image may be averaged to determine an overall change in position for the image and/or frame. It may be appreciated that a velocity may be determined based on the change in position and a frame and/or image rate. In some embodiments, the changes in position may be low pass filtered to reduce high frequency noise. For example, a number of sequential frames, e.g., 10, may be averaged (e.g., running average) to provide this noise reduction.

Image and/or frame velocity (e.g., in pixels/second) may then be determined at operation 330 by dividing the change in position in pixels between the previous frame and the current frame by the time between the frames. The image and/or frame velocity in pixels per second may then be converted to groundspeed in, e.g., meters per second, at operation 332. For example, based on an angular field of view, $\theta$, of simulated camera 241 and altitude, h, a dimension, D, in units of length, e.g., meters, of the image may be determined as $D=2h*\tan(\theta/2)$. The dimension, D, may be a height, width or diagonal. A corresponding dimension, d, in pixels may be known, e.g., an image of width 640 pixels and height 480 pixels has a corresponding diagonal of 800 pixels. Length, e.g., meters, per pixel may then be determined as D/d, for a corresponding dimension. Groundspeed may then be determined as (meters/pixel)*(pixels/second) to yield velocity in meters/second. Groundspeed may be output at operation 334.

Groundspeed of a UAV may be determined according to flow chart 320, based, at least in part, on a simulated camera view. It is contemplated that, in some embodiments, groundspeed of the UAV may be determined based on estimate(s) of pitch and/or roll, determined as described herein. The UAV model is configured to receive the groundspeed from the image processor and may control "flight" of the UAV based, at least in part, on the groundspeed. For example, the UAV model may determine a velocity of the simulated UAV based, at least in part, on the groundspeed. For the simulation environment described herein, the groundspeed from the image processor may be considered an estimate and may be compared to other measures of groundspeed provided by the UAV model. In this manner, image processing techniques may be evaluated using the simulated UAV in the simulated environment.

Figure 3C:
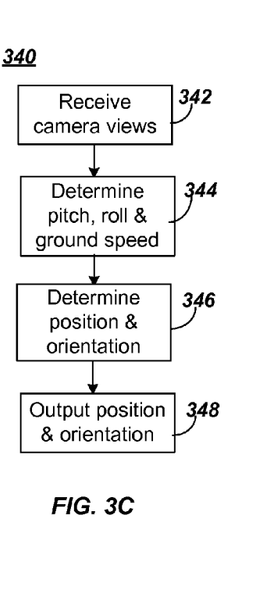

FIG. 3C depicts a flow chart 340, corresponding to processes of a UAV simulator, e.g., UAV simulator 110. The UAV simulator is configured to receive one or more camera views and to provide as output, position and/or orientation of a simulated UAV. Camera view(s) may be received at operation 342. Pitch, roll and/or groundspeed may be determined at operation 344. Position and/or orientation may be determined at operation 346. The position and/or orientation may be based, at least in part, on the pitch, roll and/or groundspeed determined at operation 344. The position and/or orientation determined at operation 346 may be output at operation 348.

For example, one or more of the camera simulator(s) 130a, 130b, . . . , 130n and/or the graphical simulator 120 may provide the camera view(s) to the UAV simulator 110. The UAV simulator 110 may determine pitch, roll and/or groundspeed, using, e.g., image processor 155, as described herein. The UAV model 140 may receive the pitch, roll and/or groundspeed and may then determine position and/or orientation of the simulated UAV. The UAV simulator 110 may output the position and/or orientation of the simulated UAV to the graphical simulator 120.

Figure 3D:
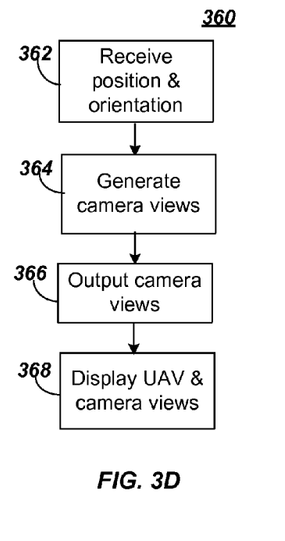

FIG. 3D depicts a flow chart 360 corresponding to processes of a graphical simulator, e.g., graphical simulator 120. The graphical simulator 120 and/or simulated camera(s) 130a, . . . , 130n are configured to receive position and/or orientation from a simulated UAV and to provide as output, one or more camera views. Position and/or orientation may be received at operation 362. One or more camera view(s) may be generated at operation 364. The camera view(s) may be based, at least in part, on the position and/or orientation determined at operation 364. The camera views may be output at operation 366. The camera view(s) and/or a view of a simulated UAV in a simulated environment may be displayed at operation 368. The view of the simulated UAV may be based at least in part on the position and/or orientation data received at operation 362.

For example, the UAV simulator 110 may provide the position and/or orientation to the graphical simulator 120. The graphical simulator 120 and/or simulated camera(s) 130a, . . . , 130n may generate one or more camera view(s) based at least in part on the position and/or orientation, as described herein. The graphical simulator 120 may display the camera view(s) and/or the simulated UAV in a simulated environment, based at least in part, on the position and/or orientation provided by the UAV simulator 110. The graphical simulator 120 and/or simulated camera(s) 130a, . . . , 130n may output the camera view(s) to the UAV simulator 110.

Figure 4:
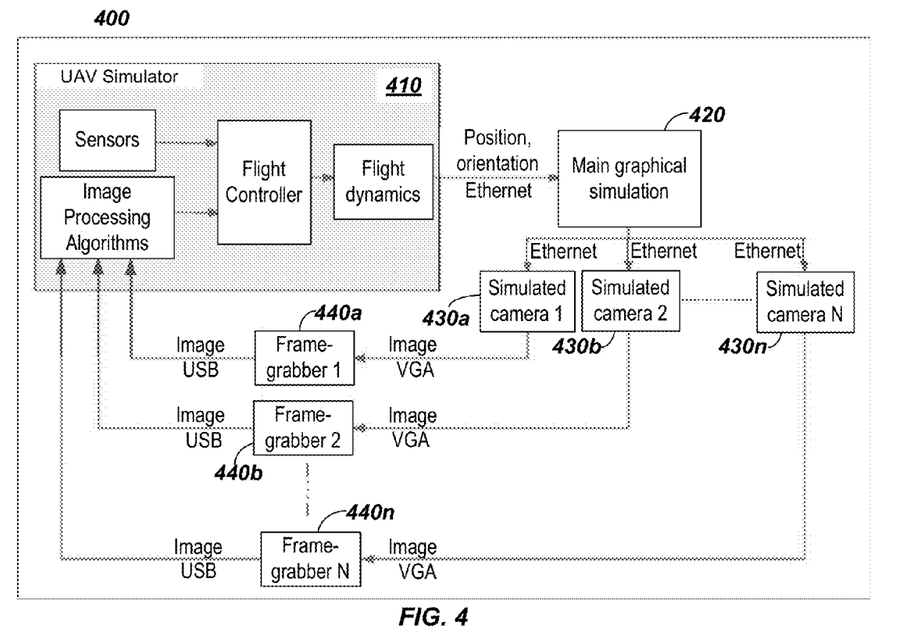
FIG. 4 depicts a system block diagram of an exemplary simulation system, consistent with the present disclosure.

Attention is directed to FIG. 4, depicting a system block diagram 400 of a simulation system consistent with the present disclosure. The system block diagram 400 illustrates communication protocols and/or formats between functional blocks. For example, communication of position and/or orientation between a UAV simulator 410 and a graphical simulator 420 may use an Ethernet protocol. Ethernet is a family of frame-based computer networking technologies, standardized as Institute of Electrical and Electronics Engineers standard IEEE 802.3. Communication between the graphical simulator 420 and one or more simulated camera(s) 430a, 430b, . . . 430n may use the Ethernet protocol. The system block diagram 400 illustrates frame grabbers 440a, 440b, . . . , 440n that may be used to convert image(s) from VGA format to, e.g., USB format. For example, the simulated camera(s) 430a, 430b, . . . 430n may output images using VGA format. The frame grabbers 440a, 440b, . . . , 440n are configured to capture the images frame by frame and to convert the frames from VGA format to USB format as described herein. The frames in USB format may then be provided to the UAV simulator 410.

Figure 5:
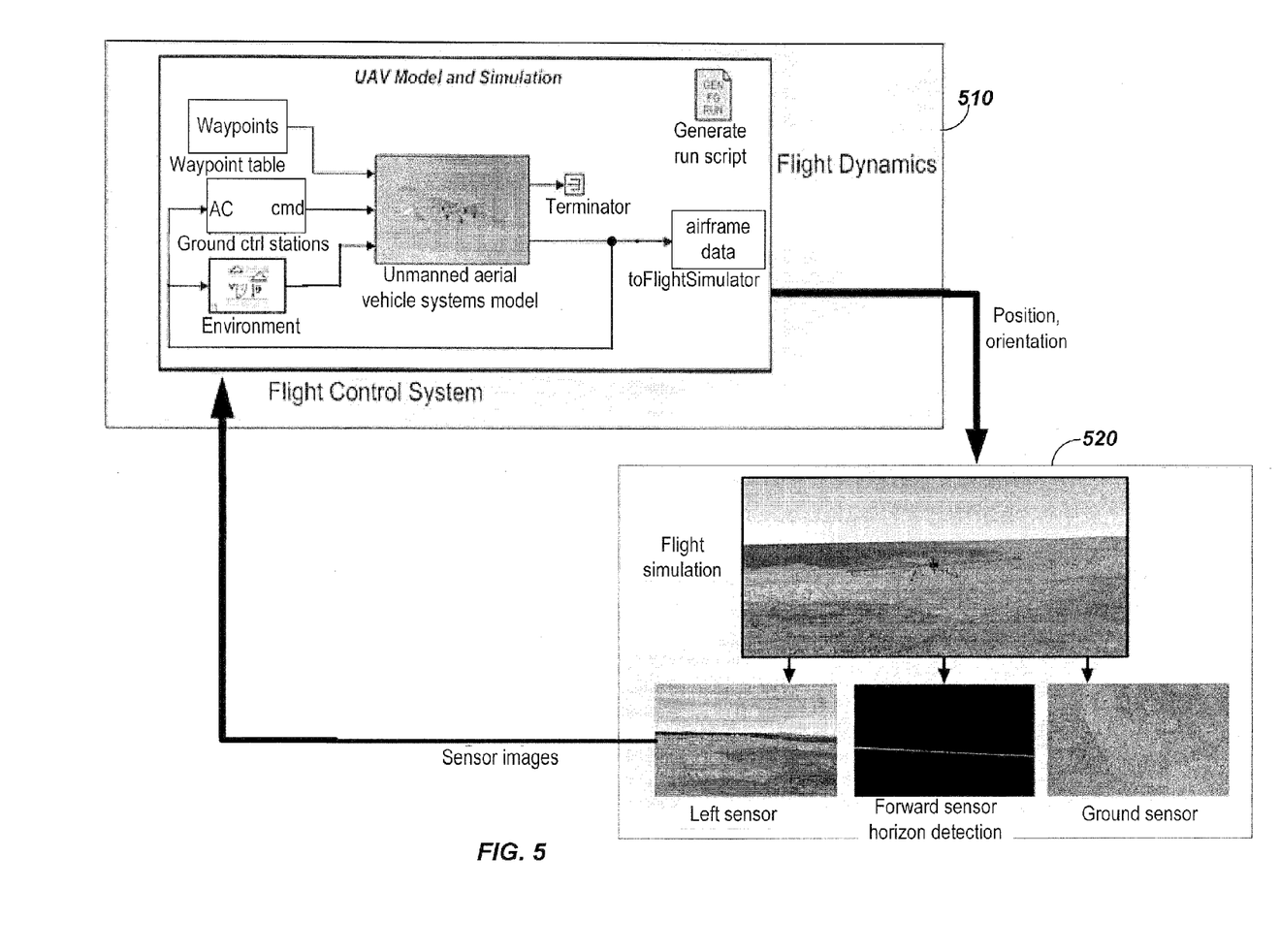
FIG. 5 illustrates, graphically, a UAV simulator, graphical simulator and interconnections.

FIG. 5 illustrates, graphically, a UAV simulator 510 and a graphical simulator 520 as well as interconnections. For example, the UAV simulator 510 may provide position and orientation of a simulated UAV to the graphical simulator 520, based on sensor image(s) received by the UAV simulator 510, as described herein. The sensor image(s), e.g., visual images, may be provided to the UAV simulator 510 from the graphical simulator 520, based, at least in part, on position and/or orientation from the UAV simulator 510.

Figure 6:
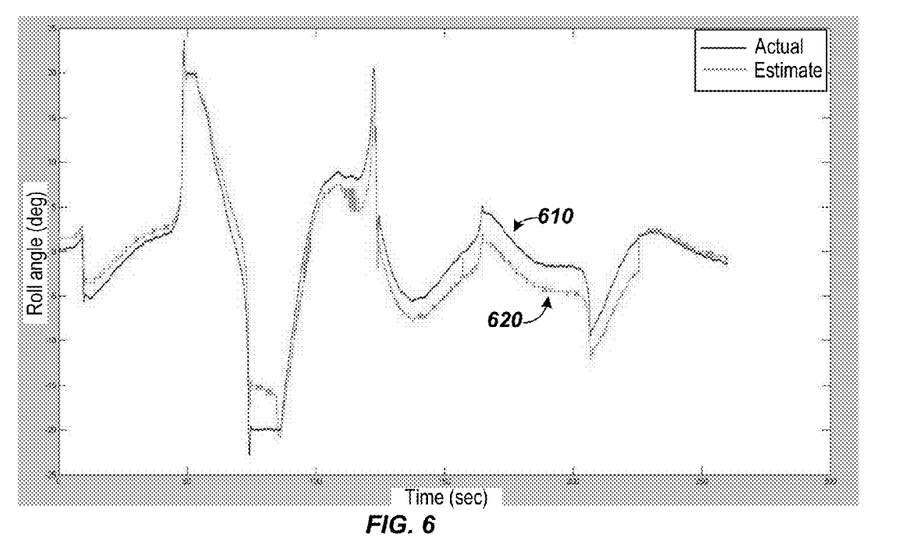
FIGS. 6 through 8 are plots illustrating comparisons of estimated roll, estimated pitch and estimated groundspeed, consistent with the present disclosure, and other measures of roll, pitch and groundspeed, respectively.
Figure 7:
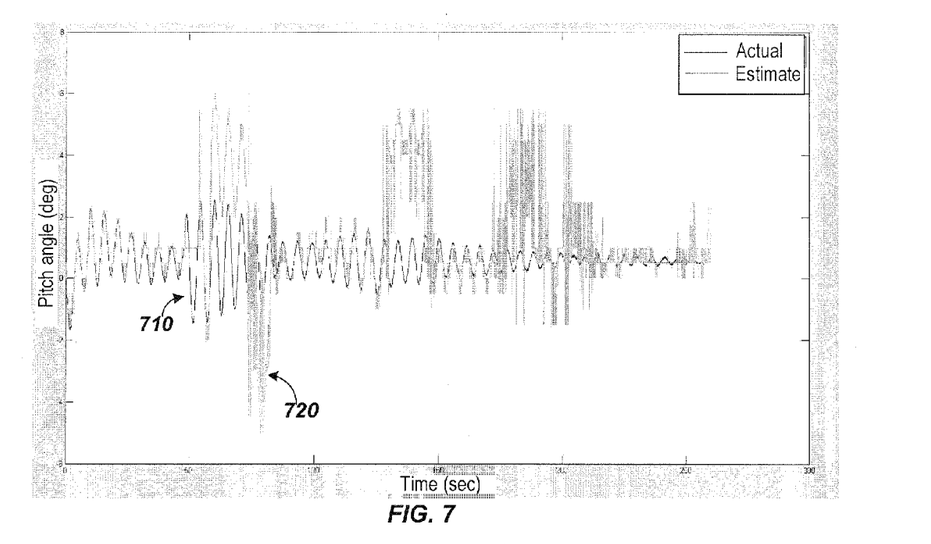
Figure 8:
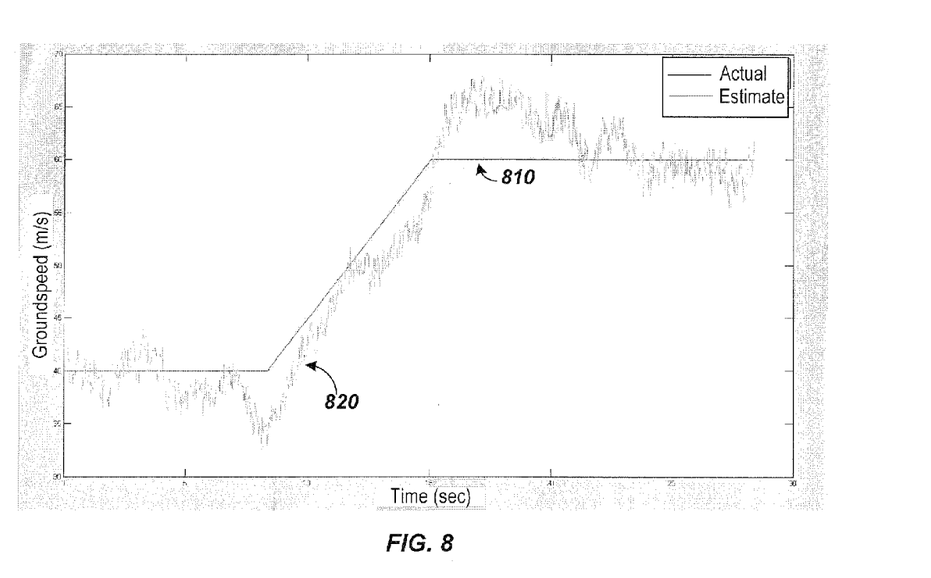

FIGS. 6 through 8 are plots illustrating comparisons of estimated roll, estimated pitch and estimated groundspeed, determined based on simulated camera images as described herein, with roll, pitch and groundspeed, respectively, determined using the UAV simulator 110 and other measures of roll, pitch and groundspeed. The other measures may be based, at least in part, on data from other sensor(s) 146. In the figures, "actual" refers to a parameter determined based on data from other sensor(s) 146 and "estimated" refers to the parameter determined based on simulated camera view(s). Referring to FIG. 6, an actual roll angle 610 is compared to an estimated roll angle 620. Referring to FIG. 7, an actual pitch angle 710 is compared to an estimated pitch angle 720. Referring to FIG. 8, an actual groundspeed 810 is compared to an estimated groundspeed 820. It may be appreciated that the estimated parameters, i.e., pitch, roll and/or groundspeed are not without error. It is contemplated that estimation algorithms, e.g., Kalman filtering, may be implemented to improve accuracy of the image processing algorithms. These algorithms may be implemented and evaluated using a simulation environment, consistent with the present disclosure. Accordingly, a simulation environment including a UAV simulator and a graphical simulator may be used to develop and/or evaluate sensor systems for UAVs.

Figure 9:
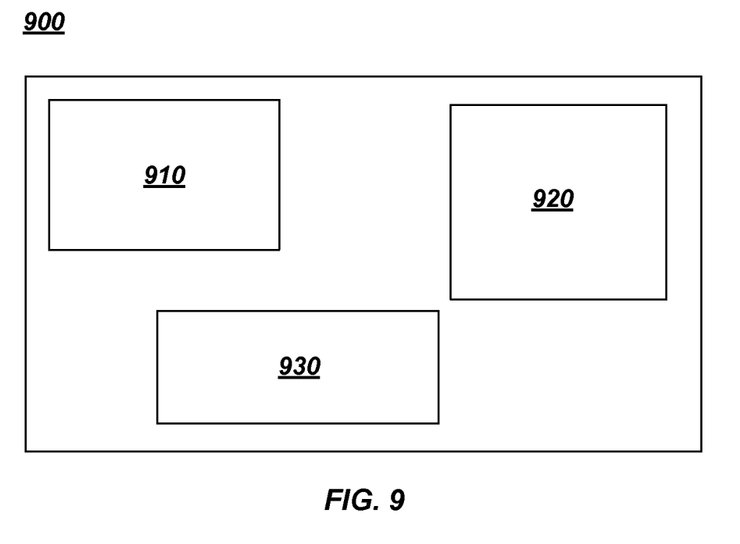
FIG. 9 depicts an optical state estimation and simulation environment for unmanned aerial vehicles, including a processor and machine readable media and user interface consistent with the present disclosure.

It should also be appreciated that the functionality described herein for the embodiments of the present invention may be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to system 900 of FIG. 9, optical state estimation and simulation environment for unmanned aerial vehicles may include a processor (910) and machine readable media (920) and user interface (930).

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. A method for simulating an unmanned aerial vehicle (UAV) in a simulated environment, said method comprising:
   (1) receiving a first simulated view of said simulated environment from a graphical simulator configured to simulate at least one visual sensor positioned on said simulated UAV;
   (2) estimating pitch, roll and groundspeed associated with said simulated UAV, based at least in part, on said first simulated view from said simulated visual sensor, using a first processor, wherein said pitch and said roll are based on an angle of said simulated UAV relative to a simulated horizon in said simulated environment, said simulated horizon determined by a Hough transformation of an output of a Sobel edge detection filter applied to said first simulated view, and wherein said groundspeed is based on a block matching algorithm configured to match a region of said first simulated view to a region of a previous simulated view and to estimate motion based on a difference in position of said region of said first simulated view and said region of said previous simulated view, wherein a size of said region is based on a maximum groundspeed, altitude and field of view of said simulated visual sensor;
   (3) comparing said estimated pitch, roll and groundspeed, to data generated by a simulated global positioning system (GPS), said comparison to evaluate said simulated visual sensor;

(4) determining at least one of a position and an orientation of said simulated UAV, based at least in part, on said estimated pitch, roll and groundspeed, using said first processor;

(5) simulating said UAV in said simulated environment at said at least one of said position and said orientation, using a second processor;

(6) generating a second simulated view based on at least one of said position and said orientation; and (7) repeating steps 1 through 5 using said second simulated view.

2. The method of claim 1 wherein said first simulated view from said at least one simulated visual sensor is generated using said second processor based, at least in part, on said at least one of said position and said orientation of said simulated UAV in said simulated environment.

3. The method of claim 1 wherein said first simulated view from said at least one simulated visual sensor is generated using at least one other processor based, at least in part, on said at least one of said position and said orientation of said simulated UAV in said simulated environment.

4. The method of claim 1 wherein the first processor is included in a first computer system and the second processor is included in a second computer system.

5. The method of claim 1 further comprising displaying said simulated UAV in said simulated environment.

6. The method of claim 1 further comprising displaying at least one simulated view of said at least one simulated visual sensor.

7. A system comprising:
a first processor configured to:
simulate an unmanned aerial vehicle (UAV),
estimate pitch, roll and groundspeed associated with said UAV, based at least in part, on a first simulated view from a graphical simulator configured to simulate at least one visual sensor, wherein said pitch and said roll are based on an angle of said simulated UAV relative to a simulated horizon, said simulated horizon determined by a Hough transformation of an output of a Sobel edge detection filter applied to said first simulated view, and wherein said groundspeed is based on a block matching algorithm configured to match a region of said first simulated view to a region of a previous simulated view and to estimate motion based on a difference in position of said region of said first simulated view and said region of said previous simulated view, wherein a size of said region is based on a maximum groundspeed, altitude and field of view of said simulated visual sensor,
compare said estimated pitch, roll and groundspeed, to data generated by a simulated global positioning system (GPS), said comparison to evaluate said simulated visual sensor, and
determine at least one of a position and an orientation of said UAV, based at least in part, on said estimated pitch, roll and groundspeed; and
a second processor configured to:
simulate an environment,
simulate said UAV in said environment at said at least one of said position and said orientation;
generate a second simulated view based on at least one of said position and said orientation; and
provide said second simulated view to said first processor to repeat said estimation of said pitch, roll and groundspeed using said second simulated view.

8. The system of claim 7 wherein the first processor is included in a first computer system and the second processor is included in a second computer system.

9. The system of claim 7 wherein said second processor is further configured to display said simulated UAV in said simulated environment.

10. The system of claim 7 wherein said second processor is further configured to display at least one simulated view of said at least one simulated visual sensor.

11. An article comprising a non-transitory storage medium having stored thereon instructions that when executed by a machine result in the following operations for simulating an unmanned aerial vehicle (UAV) in a simulated environment:

(1) receiving a first simulated view of said simulated environment from a graphical simulator configured to simulate at least one visual sensor positioned on said simulated UAV;

(2) estimating pitch, roll and groundspeed associated with said simulated UAV, based at least in part, on said first simulated view from said simulated visual sensor, using a first processor, wherein said pitch and said roll are based on an angle of said simulated UAV relative to a simulated horizon in said simulated environment, said simulated horizon determined by a Hough transformation of an output of a Sobel edge detection filter applied to said first simulated view, and wherein said groundspeed is based on a block matching algorithm configured to match a region of said first simulated view to a region of a previous simulated view and to estimate motion based on a difference in position of said region of said first simulated view and said region of said previous simulated view, wherein a size of said region is based on a maximum groundspeed, altitude and field of view of said simulated visual sensor;

(3) comparing said estimated pitch, roll and groundspeed, to data generated by a simulated global positioning system (GPS), said comparison to evaluate said simulated visual sensor;

(4) determining at least one of a position and an orientation of said simulated UAV, based at least in part, on said estimated pitch, roll and groundspeed, using said first processor;

(5) simulating said UAV in said simulated environment at said at least one of said position and said orientation, using a second processor;

(6) generating a second simulated view based on at least one of said position and said orientation; and (7) repeating steps 1 through 5 using said second simulated view.

12. The article of claim 11 wherein said simulated view from said at least one simulated visual sensor is generated using said second processor based, at least in part, on said at least one of said position and said orientation of said simulated UAV in said simulated environment.

13. The article of claim 11 wherein said simulated view from said at least one simulated visual sensor is generated using at least one other processor based, at least in part, on said at least one of said position and said orientation of said simulated UAV in said simulated environment.

14. The article of claim 11 wherein the first processor is included in a first computer system and the second processor is included in a second computer system.

15. The article of claim 11 wherein the instructions further result in the following operations:
displaying said simulated UAV in said simulated environment.

16. The article of claim 11 wherein the instructions further result in the following operations:
 displaying at least one simulated view of said at least one simulated visual sensor.

* * * * *